L. E. SNYDER.
FILM PACK.
APPLICATION FILED JAN. 23, 1919.
1,343,590.
Patented June 15, 1920.
3 SHEETS—SHEET 1.
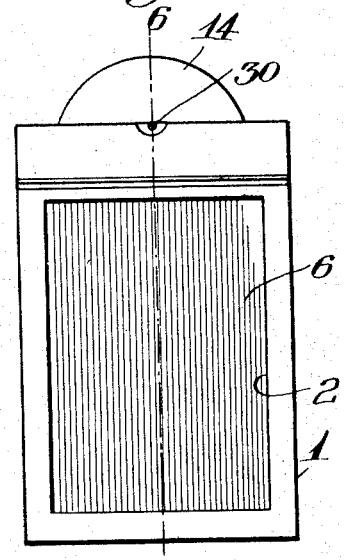
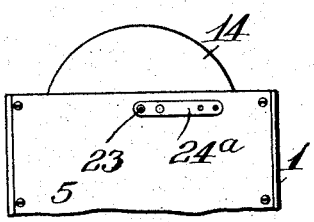
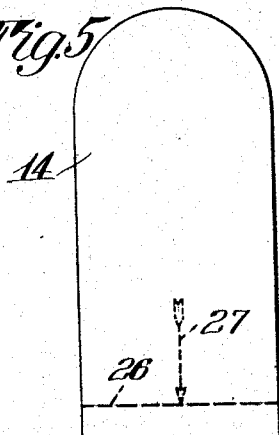
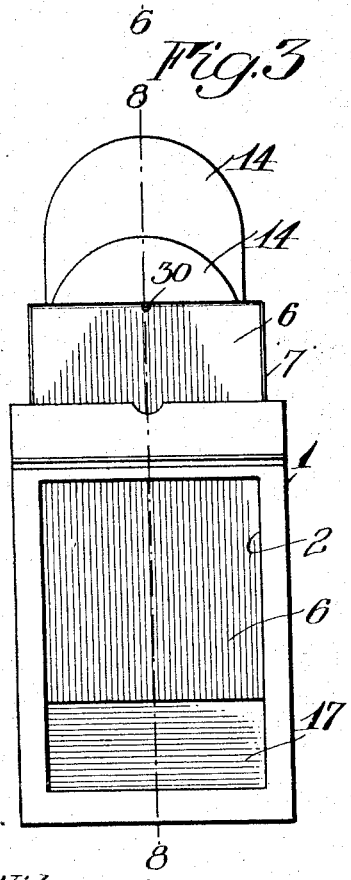
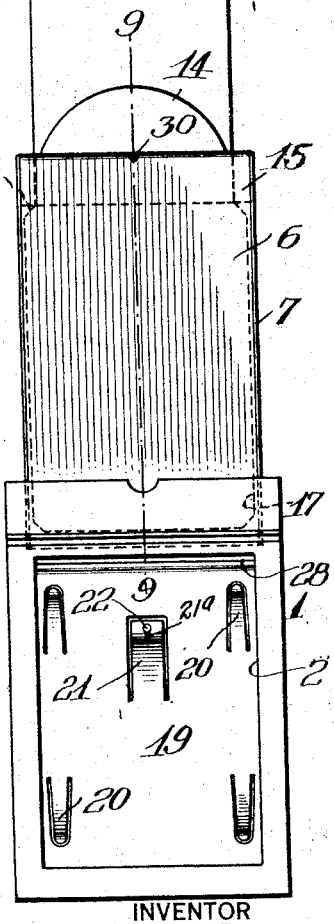
INVENTOR
Lloyd E. Snyder
BY
his ATTORNEYS L. E. SNYDER.
FILM PACK.
APPLICATION FILED JAN. 23, 1919.
1,343,590.
Patented June 15, 1920.
3 SHEETS—SHEET 2.
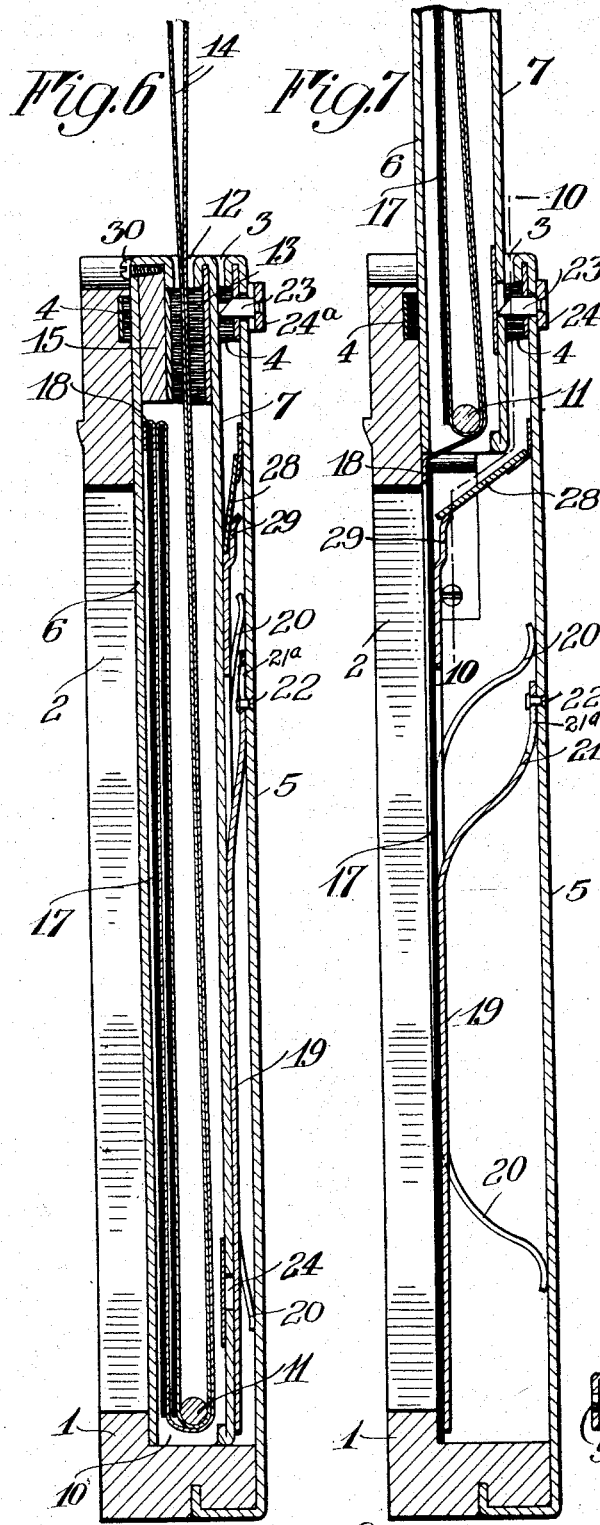
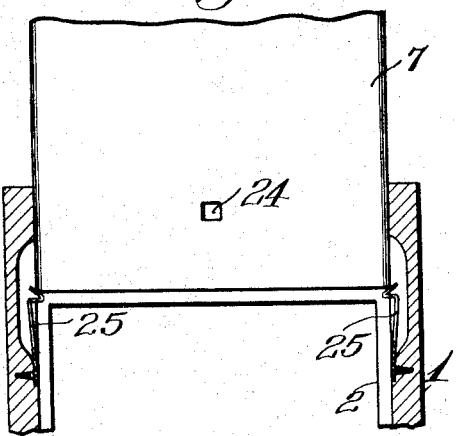
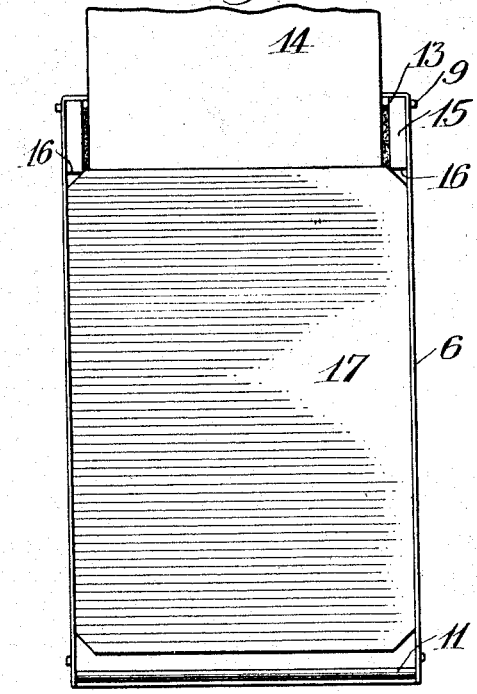
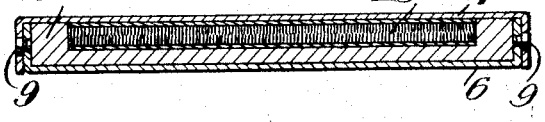
INVENTOR
Lloyd E. Snyder
BY
his ATTORNEYS

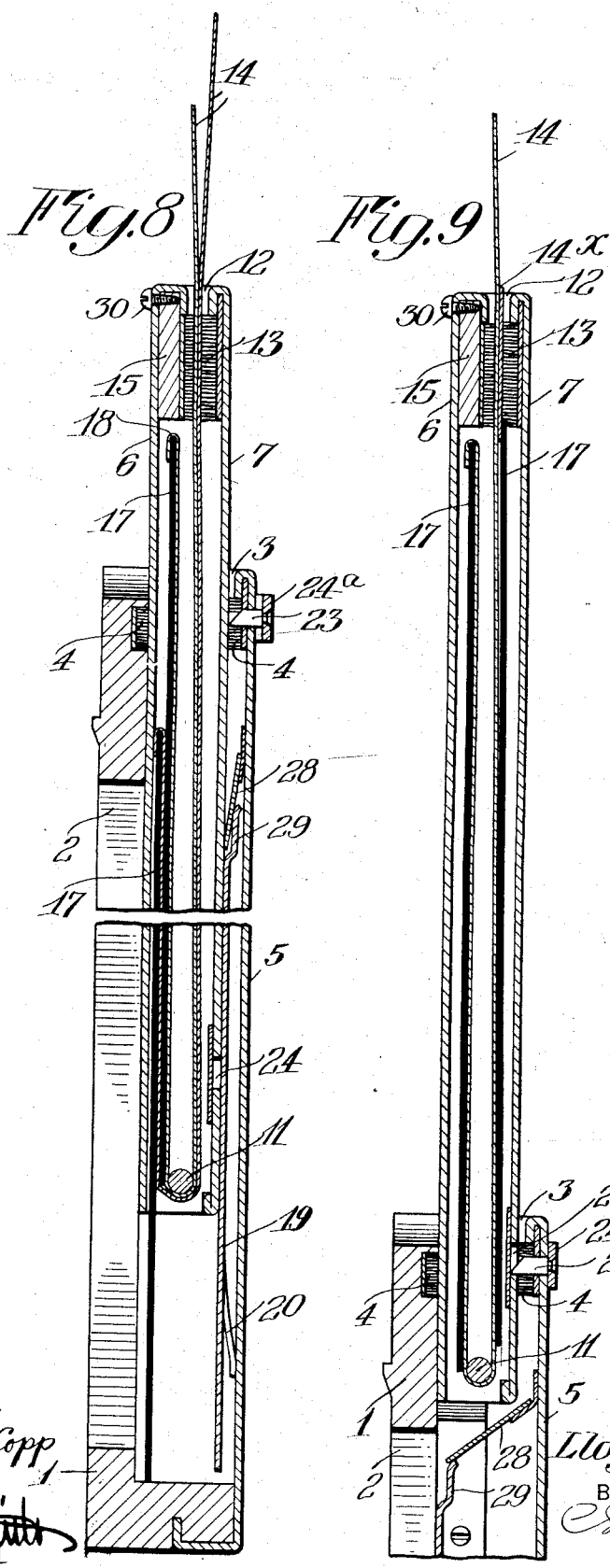

UNITED STATES PATENT OFFICE.

LLOYD E. SNYDER, OF ROCHESTER, NEW YORK, ASSIGNOR TO EASTMAN KODAK COMPANY, OF ROCHESTER, NEW YORK, A CORPORATION OF NEW YORK.

FILM-PACK.

1,343,590.

Specification of Letters Patent.  Patented June 15, 1920.

Application filed January 23, 1919.  Serial No. 272,759.

*To all whom it may concern:*

Be it known that I, LLOYD E. SNYDER, of Rochester, in the county of Monroe and State of New York, have invented certain new and useful Improvements in Film-Packs; and I do hereby declare the following to be a full, clear, and exact description of the same, reference being had to the accompanying drawings, forming a part of this specification, and to the reference-numerals marked thereon.

My present invention relates to photography and more particularly to photographic plate and film holders and it has for its object to provide an adapter whereby a pack of films or plates may be conveniently and expeditiously exposed in succession without danger of fogging those which are yet in the magazine. Another object is to provide a construction of this kind in which the films may be easily renewed when necessary and a further object of the invention is to provide a device having the characteristics of an ordinary plate holder of standard size so that it may be used in standard cameras without specially adapting the latter thereto. To these and other ends the invention resides in certain improvements and combinations of parts all as will be hereinafter more fully described, the novel features being pointed out in the claims at the end of the specification.

In the drawings:

Figure 1 is a front view of a film pack and its adapter constructed in accordance with and illustrating one embodiment of my invention, the parts being in normal position;

Fig. 2 is a fragmentary view of the rear side thereof;

Figs. 3, 4 and 5 are front views showing three successive steps in the feeding, exposing and storage of a film or plate;

Fig. 6 is an enlarged sectional view on the line 6—6 of Fig. 1;

Fig. 7 is an enlarged sectional view taken on the line 7—7 of Fig. 4;

Fig. 8 is an enlarged sectional view taken substantially on the line 8—8 of Fig. 3;

Fig. 9 is a similar view taken on the line 9—9 of Fig. 5;

Fig. 10 is a reduced sectional detail taken on the line 10—10 of Fig. 7;

Fig. 11 is a front view of the film pack with the cover removed after the last film has been exposed;

Fig. 12 is a side view of the film pack on the scale of Fig. 11, and

Fig. 13 is a transverse section on the line 13—13 of Fig. 12.

Similar reference numerals throughout the several views indicate the same parts.

My device is particularly adapted for use in connection with the handling of cut film in portrait work, which films are relatively heavy and stiff. I will first give a general idea of the construction and the plan upon which the film changer works. It consists of a holder having the conformation of an ordinary plate holder and adapted to be inserted in a camera in the same manner. A sliding two-part film case within the holder contains a plurality of film sheets in the manner of an ordinary film pack, except that the tabs are connected to the upper or outer ends instead of to the lower ends. When the case is partially withdrawn so that it projects from the holder, pulling on the tab projects the attached film back into the holder again in front of the exposure aperture thereof and between it and a spring-pressed follower. After exposure, the tab is drawn out farther which carries the exposed sheet into the case again but in rear of the pile of films therein. The shifting of the first film may also be utilized to withdraw the case from the holder with one and the same movement. In the figures, the film sheets, where appearing in section, are drawn in solid black.

Referring more particularly to Figs. 1 and 6, 1 indicates the holder corresponding, as stated, to the ordinary plate holder and having an exposure opening 2 at the front and an opening 3 at the top protected by the usual light seals 4. In the present instance, its rear is closed by a sheet metal plate 5, making it correspond to a single instead of a double plate holder. Slidable within the holder is a two-part film case or magazine 6, the body portion thereof being indicated by 6 and the cover at 7. These two parts come away from each other toward the front and rear and are normally held together by notched portions 8 on one coöperating with pins 9 on the other where their flanges overlap at the sides. The lower or inner end of the case is open at 10, which opening is spanned by a cylindrical bar 11 forming a guide, while the upper end has a restricted slot 12 therein protected by light seals 13 as in an ordinary film pack, to safely permit the projection to the exterior of the operating tabs 14. The said light seal 13 and slot 12 are formed in a block 15 (see also Figs. 11 and 13) which block provides stop shoulders 16 for the film sheet as hereinafter explained.

The tabs 14 may be made of flexible black paper, as usual, except that they are longer and they are attached to the film sheets 17 at their upper or outer edges 18 instead of at their lower edges. Each tab passes thence downwardly in rear of its sheet, around the guide bar 11 and thence upwardly and outwardly through the slot 12. Normally, the case 6 occupies the position in the holder 1 shown in Fig. 6 sealing the exposure aperture 2 and lying between it and a spring pressed thin metal follower 19, the spring fingers 20 of which may be struck out from the material thereof, as shown in Figs. 5 and 6, to bear against the rear wall 5 of the holder. Another similar spring finger 21 is slotted at 21ª for support upon a rivet on the said wall at 22 to hold the follower in place.

In the operation of the device, when the case 6 is partially withdrawn from the holder and is wholly withdrawn from in rear of the exposure aperture 2, as shown in Figs. 4 and 5, also in Fig. 7, it is prevented from complete withdrawal and detachment so that it will still close the opening 3 of the holder by the engagement of a catch pin 23 with a recess 24 in the lower portion of the back wall of the case (see also Fig. 10). As shown in Fig. 2, the catch pin 23 is carried on a leaf spring 24ª secured to the rear plate 5 of the holder 1 and operating through a suitable opening therein and through the light seal 4. The case is at the same time supported against slipping back into the holder by yielding spring retainers 25 located in recesses in the side walls of the holder, as shown in Fig. 10. The tab 14 of the first film is now drawn out to a predetermined extent that may be marked by a transverse line 26 and arrow 27 on the tab coming into coincidence with the top edge of the case, as shown in Fig. 4. This carries the attached film sheet downwardly from the case 6 into the interior of the holder 1 where it is held against the exposure aperture 2 in position for exposure by the follower 19 which has, in the meantime, expanded, as shown in Fig. 7, upon the departure of the case 6 from in front of it. As soon as the exposure is made, the tab is drawn out to its fullest extent, as shown in Fig. 5, and then torn off, as shown at 14ˣ in Fig. 9. With this operation, the attached film sheet 17 is drawn upwardly or outwardly back into the case or magazine 6, but this time in rear of its former position and in rear of the unexposed sheet and of both plies of the tabs thereof as it passes in rear of the guide bar 11 instead of in front thereof. Its travel is illustrated by a comparison of Figs. 7 and 9. When so restored to the case, the sheet is halted in position by coming in contact with the shoulders 16, as shown in Figs. 9 and 11. The successive film sheets from front to rear of the case or magazine are exposed one after the other in this manner. Only two sheets are shown in the illustrations but more would ordinarily be comprised.

If it is now desired to expose no further films and to restore the case 6 to the holder 1, it is pushed into the latter, the catch 23 yielding because of the beveled face shown and the supports 25 automatically yield with the inward pressure. A flap 28 that swings from the rear wall 5 of the holder has, in the meantime, assumed the inclined position of Fig. 7 with its forward free edge in coöperation with an offset lip 29 at the top edge of the follower 19. As the case 6 is slid downwardly or inwardly, its end edge coöperates with this flap and displaces it rearwardly which causes it to pull the upper edge of the follower 19 rearwardly with it. The case is thus guided down in front of the follower and finally flattens it against the back of the holder again, as shown in Fig. 6. The offset lip 29 also serves to guide an advancing film into the holder between the exposure aperture 2 and follower 19 and to enable the film to displace the follower rearwardly to this extent.

The film shifting devices may also be utilized, providing the films are stiff enough, to cause the withdrawal of the case 6 to its extended position instead of pulling it out directly which latter is ordinarily done by resorting to a small thumb-piece 30 shown in Figs. 1 and 6. As shown in Figs. 3 and 8, if the tab 14 of the film to be advanced is drawn upon while the case is within the holder, the said film will retain its relative position and press at its lower edge against the bottom of the holder. The pulling force of the tab reacting against the guide bar 11 as it travels over it, will withdraw the case to its extended position and cause it to merely uncover the film to be exposed which is already in front of the exposure opening.

It is intended in the present embodiment that the case 6 constitute a permanent part of the device and be taken into the dark room with the holder for re-filling when the supply of films has become exhausted.

It is to be noted in connection with the present device that the front and rear walls of the case 6 are imperforate so that in the position of Fig. 6, the exposure opening 2 is completely sealed thereby while unexposed films not yet drawn upon, as well as exposed films that have been returned to the case are not in line with the exposure opening 2 during the exposure of any given film but are protected at a point removed from the locality of the exposure by the case 6 in which they are contained.

I claim as my invention:

1. In a film pack, the combination with a holder having an exposure aperture therein, of a film case open at its inner end and slidable endwise therein, said film case being adapted to contain a plurality of film sheets, and means carried by the case for sliding a film from the latter into the holder when the case is withdrawn therefrom.

2. In a film pack, the combination with a holder having an exposure aperture therein, of a film case open at its inner end and slidable endwise therein, a plurality of film sheets in the case and flexible tabs connected to the outer ends of the film sheets and adapted to draw the films successively from the case into the holder when the former is withdrawn from the latter.

3. In a film pack, the combination with a holder having an exposure aperture therein, of a film case open at its inner end and slidable endwise therein, a guide at the said open end of the case, a plurality of film sheets in the case and flexible tabs connected to the outer ends of the film sheets and passing thence around the guide and out through the outer end of the case.

4. In a film pack, the combination with a holder having an exposure aperture in its front and a spring follower in rear of the aperture, of a film case open at its inner end and slidable endwise in the holder, a catch for preventing the complete withdrawal of the case, a guide at the open end of the latter, a plurality of film sheets in the case and flexible tabs connected to the outer ends of the film sheets and passing thence around the guide and out through the outer end of the case, said tabs being adapted to draw the films successively from the case into the holder between the exposure aperture thereof and the follower and thence back into the case again.

5. In a film pack, the combination with a holder having an exposure aperture therein, of a film case open at its inner end and slidable endwise in the holder, a catch for preventing the complete withdrawal of the case, supports for maintaining the case on the holder in extended position, and means carried by the case for sliding a film from the latter into the holder when the case is extended.

6. In a film pack, the combination with a holder having an exposure aperture therein and a spring follower in rear of the aperture, of a film case open at its inner end and slidable endwise in the holder, and means for sliding a film from the case into the holder when the case is extended from the latter, the outer end of the follower being offset to guide such film between the follower and the exposure aperture.

7. In a film pack, the combination with a holder having an exposure aperture therein and a spring follower in rear of the aperture, of a film case open at its inner end and slidable endwise in the holder, means for sliding a film from the case into the holder when the case is extended from the latter, the outer end of the follower being offset to guide such film between the follower and the exposure aperture, and a flap in the holder coöperating with such offset portion of the follower and actuated by the case to deflect the follower when the case is slid into the holder.

8. In a film pack, the combination with a holder having an exposure aperture therein, of a film case open at its inner end and slidable endwise in the holder, and means reacting against the case for forcing a film inwardly against the bottom of the holder and thereby sliding the case outwardly from the latter.

9. In a film pack, the combination with a holder having an exposure aperture therein, of a film case open at its inner end and slidable endwise in the holder, a guide at the said open end of the case, a plurality of films in the latter and tabs connected to the outer ends of the films and passing around the guide and thence through the outer end of the case to withdraw the latter and maintain a film in position in front of the exposure opening of the holder.

10. A film pack comprising a two-part case having imperforate front and rear walls, a light sealed slot at one end and an opening at the other adapted to permit the withdrawal of the contents.

11. A film pack constructed in accordance with claim 10 and further provided with a tab guide adjacent to its open end.

LLOYD E. SNYDER.